US 6,513,812 B1

(12) United States Patent
Yang et al.

(10) Patent No.: US 6,513,812 B1
(45) Date of Patent: Feb. 4, 2003

(54) COMBINED LIP SEAL AND TURBINE SEAL

(75) Inventors: Jibin Yang, Troy, MI (US); Siavash Eshghy, Bloomfield Hills, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 860 days.

(21) Appl. No.: 08/850,981

(22) Filed: May 5, 1997

(51) Int. Cl.$^7$ ................................................ F16J 15/32
(52) U.S. Cl. ........................ 277/561; 277/424; 277/351; 277/353
(58) Field of Search ................................. 277/346, 347, 277/350, 351, 412, 559, 549, 553, 561, 563, 564, 565, 423, 424, 400

(56) References Cited

U.S. PATENT DOCUMENTS

| | | | | |
|---|---|---|---|---|
| 3,871,666 A | * | 3/1975 | Franz et al. | 277/563 |
| 4,337,956 A | * | 7/1982 | Hopper | 277/563 |
| 4,721,312 A | * | 1/1988 | Hornberger | 277/424 |
| 4,844,484 A | * | 7/1989 | Antonini et al. | 277/561 |
| 5,201,529 A | * | 4/1993 | Heinzen | 277/351 |
| 5,211,406 A | * | 5/1993 | Katzensteiner | 277/351 |

* cited by examiner

Primary Examiner—Lynne H. Browne
Assistant Examiner—David E. Bochna
(74) Attorney, Agent, or Firm—Carlson, Gaskey & Olds

(57) ABSTRACT

A novel sealing device is disclosed that provides an enhanced seal at the interface between a rotary shaft and a stationary housing for automotive applications such as transmissions and axle assemblies. The sealing device preferably includes a first seal that has a plurality of turbine blade portions. As the first seal rotates with the shaft, the turbine blade portions create a hydrodynamic flow or fluid disturbance in the vicinity of the interface that effectively blows away contaminants as they approach the interface between the rotary shaft and the housing. A second seal takes one of two forms. One is a radial lip seal that includes a pocket portion between two contact surfaces. A plurality of openings allow lubricant from the system to enter into the pocket portion, which provides lubricant along the contact surfaces of the lip seal. The presence of the lubricant enhances the seal life. Further, the radial lip seal includes a bellows-like connecting portion that flexes responsive to radial and axial movements of the rotary shaft relative to the housing. The other form of the second seal is a radial seal propeller portion and a lip seal portion that is affected by centrifugal force. The propeller portion maintains a primary lubricant seal at high speed shaft rotation. The lip seal portion maintains a contact seal at low speed and stationary conditions. The two disclosed seals can be used individually or in combination.

20 Claims, 2 Drawing Sheets

COMBINED LIP SEAL AND TURBINE SEAL

BACKGROUND OF THE INVENTION

This invention generally relates to an arrangement for sealing an interface between a rotating shaft and a stationary housing.

Automotive vehicles include rotary shafts that are at least partially received in and rotate relative to a stationary housing. Examples of such arrangements are found in conventional transmissions and axle assemblies. It is necessary to provide a seal at the interface between the shaft and the housing. Sealing the interface is necessary because under many driving conditions, especially during rain, large amounts of contaminants are present that could enter into the interface between the shaft and the housing and cause eventual problems.

Conventional sealing arrangements typically include a rubber lip seal to prevent contaminants from entering into the system. Further, the rubber lip seals are used to keep lubricant from exiting the system. There are several problems with conventional rubber lip seals. First, rubber lip seals tend to wear out in an undesirable fashion. The rotary shafts on most vehicles rotate at very high speeds and the constant contact between the rotating shaft and the rubber lip seal causes the seal to wear. Further, the presence of contaminants along the contact area between the shaft and the rubber lip seal often cause significant wear on the seal, resulting in short seal life. A further problem exists in that the rotary shafts have some radial and axial movement relative to the housing. With conventional lip seals, such movement is not compensated for and, a proper seal is not maintained. Under these conditions, it is more likely that outside contaminants will enter into the shaft and housing interface and, moreover, become lodged between the lip seal and the shaft resulting in faster wear-out of the seal.

Therefore, it is desirable to provide an improved sealing device for sealing the interface between a rotary shaft and a stationary housing. This invention provides a sealing device that overcomes the shortcomings and drawbacks of the prior art discussed above.

SUMMARY OF THE INVENTION

In general terms, this invention is a sealing device for sealing off an interface between a rotary shaft and a stationary housing. The sealing device of this invention takes several forms.

In one embodiment, a first seal is supported near the interface between the rotary shaft and the stationary housing. The first seal includes a plurality of propeller portions that create a fluid disturbance near the interface as the first seal rotates with the shaft. A second seal is supported to remain stationary with the stationary housing. The second seal includes a first end that is supported on the stationary housing and a second end that includes a contact surface, which contacts a peripheral surface on the rotating shaft. A biasing member biases the contact surface toward the peripheral surface on the shaft. The second seal also includes a generally flexible connecting portion that extends between the first and second ends on the second seal. The generally flexible connecting portion preferably has a bellows-shaped configuration so that it flexes in response to radial and axial movements of the shaft relative to the stationary housing. When the generally flexible connecting portion flexes, the contact surface of the second seal remains in the desirable contact with the peripheral surface on the shaft.

The various advantages and features of this invention will become apparent from the following detailed description of the preferred embodiments. The drawings that accompany the detailed description can be described as follows.

DETAILED DESCRIPTION OF THE PREFERRED EMBODIMENTS

Figure 1:
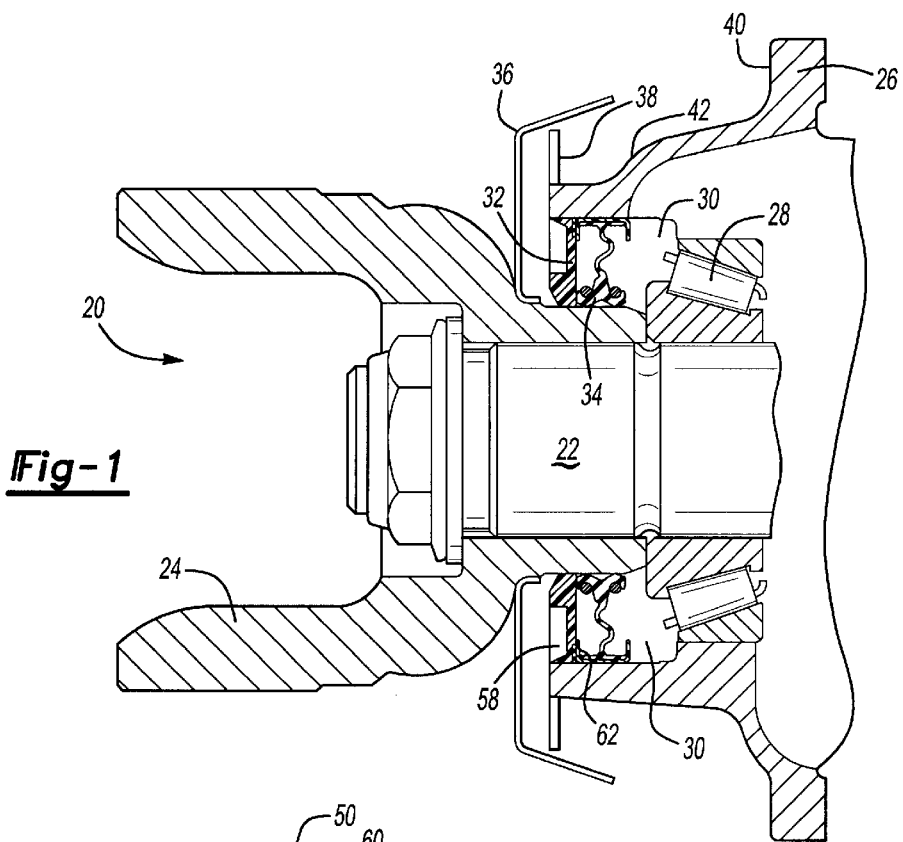
FIG. 1 is a diagrammatic, partial cross-sectional illustration of a rotary shaft assembly including a sealing device according to this invention.

FIG. 1 illustrates an assembly 20 having a rotary shaft 22 that is connected to a yoke portion 24. The rotary shaft 22 and the yoke portion 24 rotate about the longitudinal axis of the shaft 22 relative to a stationary housing 26. A set of bearings 28 are provided to facilitate rotation between the shaft 22 and the housing 26. The housing 26 and shaft 22 can be part of a vehicle axle assembly, for example. The specific type of housing and shaft are not important to understanding this invention and, therefore, will not be further described in this specification.

An interface 30 between the shaft 22 and the housing 26 must be sealed to prevent outside contaminants from entering into the system and to maintain lubricants, for the bearing 28 for example, within the system. This invention provides a sealing device that represents a substantial improvement over the prior art. The embodiment of FIG. 1 includes a first seal 32 and a second seal 34. Details regarding each of these seals will be provided in the description that follows.

In addition to the seals 32 and 34, a set of deflector plates 36 and 38 preferably are provided. The first deflector plate 36 is positioned and configured to deflect any outside contaminants, such as slurry, away from the interface area 30 when those contaminants are approaching the interface from the left (according to the drawing). The second deflector portion 38 is strategically supported on one end of the housing 26. Although the first deflector portion 36 may be effective for deflecting contaminants away as they approach from the left (according to the drawing), some of those contaminants will be incident on the wall 40 of the housing 26. These contaminants will have a tendency to flow along the wall portion 42 of the housing 26 toward the interface area 30. The deflector portion 38 effectively forms a circumferential cavity at the interface between the deflector portion 38 and the wall portion 42 of the housing 26. The combination of the deflectors 36 and 38, therefore, provide protection which assists in preventing contaminants from entering the interface area 30.

Figure 2:
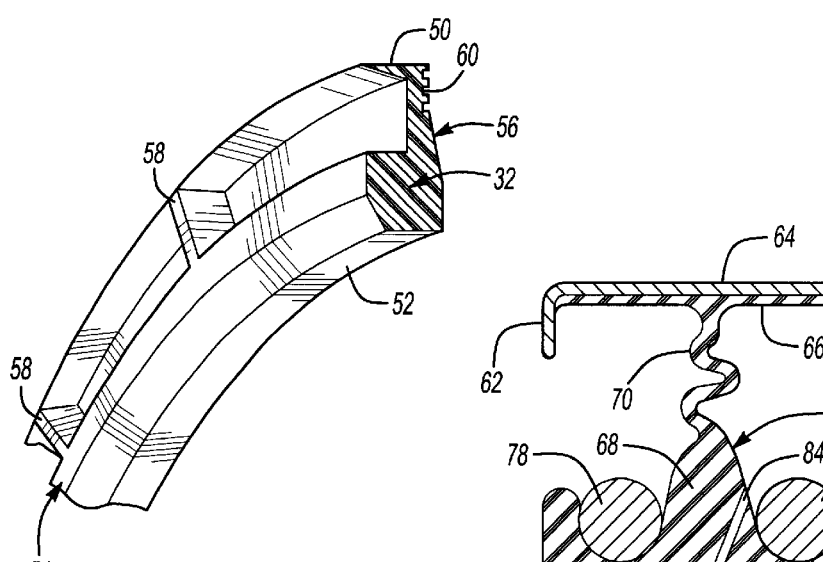
FIG. 2 is a perspective illustration of a portion of a seal designed according to this invention.

FIG. 2 illustrates a portion of the first seal 32. The first seal includes an outer peripheral surface 50 and an inner peripheral surface 52. The first seal 32 preferably is generally annular in configuration. A first face 54 extends between the peripheral surfaces 50 and 52 while a second face 56 is opposite the first face 54. In the illustration of FIG. 1, the first face 54 is facing toward the left (according to the drawing). The first face 54 preferably includes a plurality of turbine blade portions 58. The turbine blade portions preferably are circumferentially spaced about the first face 54. In the illustrated embodiment, the turbine blade portions 58 extend generally perpendicularly away from a portion of the first face 54. The specific angle of orientation of the turbine blade portions 58 can be varied depending on the requirements of a particular application.

The first seal 32 preferably is mounted in a manner that it rotates with the shaft 22 relative to the housing 26. As the shaft 22 and the seal 32 rotate, the turbine blade portions 58 create a fluid disturbance in the area of the turbine blade portions. The term "fluid" includes gas or air. The turbine blades face away from the interface 30 so that any contaminants that tend to approach the interface while the shaft 22 is rotating at a high speed are moved or blown away from the interface area by air or fluid disturbance caused by the turbine blade portions 58. Accordingly, a significant amount of contaminants that would otherwise approach the second seal 34 are prevented from ever coming in contact with that portion of the assembly 20.

The second face 56 preferably includes a plurality of labyrinth-seal type grooves 60. The labyrinth-seal type grooves are generally understood by those skilled in the art so that their function need not be further described in this specification. The portion of the second face 56 that includes the grooves 60, preferably is in facing engagement with a surface 62, which is connected to the housing 26.

The surface 62 preferably is an extension or portion of a mounting portion 64. The mounting portion 64 is fixably attached to or formed as a part of the housing 26. The mounting portion 64 serves to mount the second seal 34 so that the second seal 34 remains stationary with the housing 26 as the shaft 22 rotates.

The second seal 34 preferably includes a first end 66 that is received on or mounted upon the mounting portion 64. A second end 68 of the second seal 34 is connected with the first end 66 by a connecting portion 70 and includes a first contact surface 72. A garter spring 74 biases the first contact surface 72 against the outer peripheral surface of the shaft 22. A second contact surface 76 is spaced apart from the first contact surface 72. A second garter spring 78 biases the second contact surface 76 against the outer periphery of the shaft 22.

A pocket portion exists between the first contact surface 72 and the second contact surface 76. Preferably, a porous, sponge-like material 82 is positioned within the pocket portion 80. A plurality of circumferentially spaced openings 84 preferably are provided between the pocket portion 80 and the side of the seal 34 that is facing inward toward the bearings 28, for example. That side of the seal 34 is where the lubricant for the rotary shaft is maintained within the system. The openings 84 allow some lubricant, such as grease, to enter into the pocket portion 80. This provides the advantage of having lubricant existing on both sides of the first contact surface 72. Having a lubricant on both sides of the contact surface provides improved seal wear characteristics and longer seal life. Further, the lubricant present within the pocket portion 80 is available to lubricate at least one side of the contact surface 76. The porous material 82 is provided to regulate the amount of lubricant that is allowed to enter the pocket portion 80. For example, when a sponge-like material is used, once that material is soaked with lubricant, it effectively prevents further lubricant from entering the pocket portion 80.

The generally flexible connecting portion 70, which extends between the first end 66 and the second end 68 of the lip seal 34, is provided to compensate for radial and axial movement of the shaft 22 relative to the housing 26. In many instances, there is end-play of the shaft 22 relative to the housing 26 that allows for some radial and axial movement between the shaft 22 and the housing 26. As the shaft 22 moves in such a manner, the bellows-like flexible connecting portion 70 responsively flexes so that the first contact surface 72 and the second contact surface 76 are maintained in the desired contact with the outer peripheral surface of the shaft 22.

Figure 3:
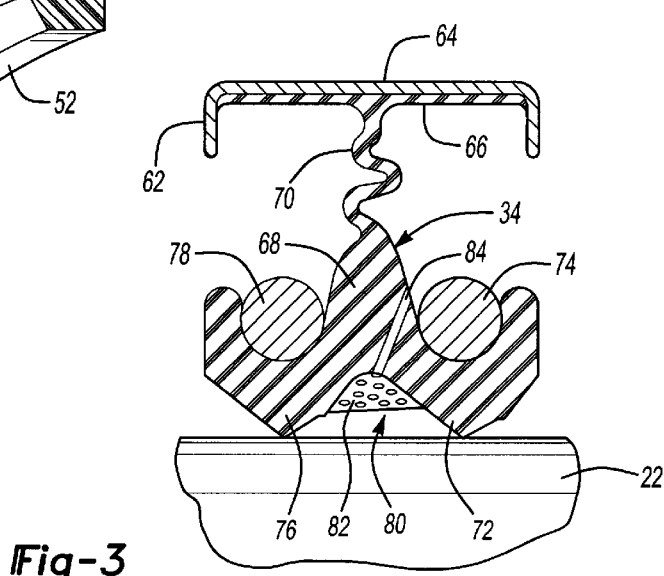
FIG. 3 is a cross-sectional illustration of a radial lip seal designed according to this invention.
Figure 4:
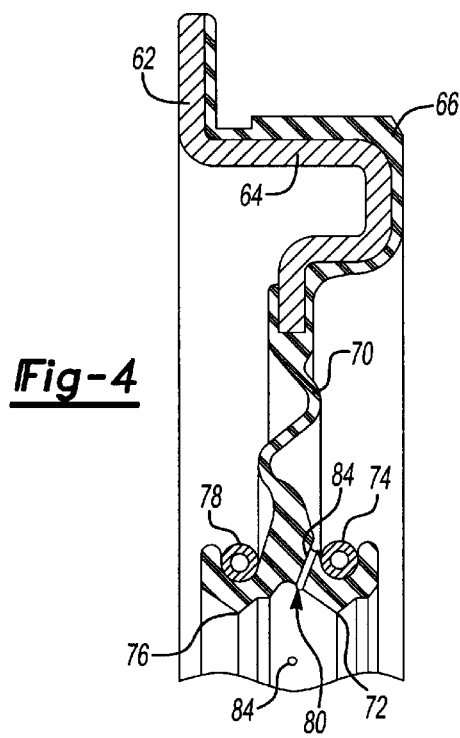
FIG. 4 is a perspective illustration of a selected portion of another radial lip seal designed according to this invention.

FIG. 4 illustrates another embodiment of a lip seal designed according to this invention. The lip seal 34 preferably is generally annular so that it surrounds the entire shaft 22. The embodiment of FIG. 4 is modified from that of FIG. 3 in that there is no porous material 82 provided in the pocket portion 80. Further, the first end 66 of the seal is modified to be mounted on a differently shaped mounting portion 64 associated with the housing 26. Otherwise, the radial lip seal of FIG. 4 operates in the same manner as that shown in FIG. 3.

Figure 5:
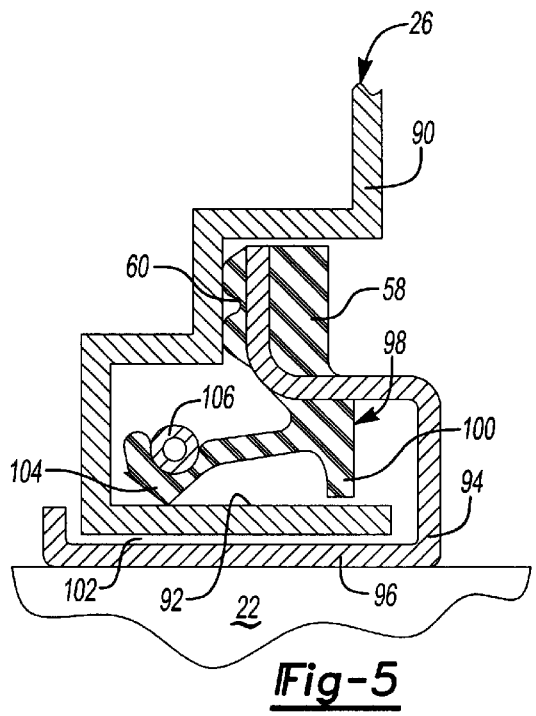
FIG. 5 is a cross-sectional illustration of another embodiment of a seal designed according to this invention.

FIG. 5 illustrates another embodiment of a sealing device designed according to this invention. The housing 26 includes an extension arm 92 that is preferably generally parallel to, although radially spaced from, the outer periphery of the shaft 22. A seal mount 94 includes an extension arm 96 that is received about and supported on the outer periphery of the shaft 22. The seal 98 is received about and supported on the seal mount 94. The seal mount 94 and the seal 98, therefore, rotate with the shaft 22 relative to the housing 26. The seal 98 preferably includes labyrinth grooves 60 and turbine blade portions 58 as described above. Spaced radially inward from the turbine blade portions 58, a non-contact hydrodynamic propeller seal portion 100 preferably includes a plurality of circumferentially spaced notches. The notches provide further turbine blade portions that cause a hydrodynamic flow that is sufficient to work as a non-contact seal when the shaft 22 and the seal 98 are rotating at high speeds. The hydrodynamic flow provided by the propeller seal portion 100 allow for that portion of the seal 98 to be radially spaced away from the extension arm 92 on the housing 96. Accordingly, there is no contact between the propeller seal portion 100 and the housing 26 so that there is no wear on the seal.

Spaced longitudinally (with respect to the shaft 22) from the propeller seal portion 100 is a contact surface 104. The contact surface 104 is much like a conventional lip seal contact surface. A garter spring 106 biases the contact surface 104 into engagement with the housing 26. The garter spring 106, however, provides a biasing force that is only strong enough to maintain contact between the extension arm 92 and the contact surface 104 under stationary and low-speed rotating conditions. As the shaft 22 and the seal 98 rotate at high speeds, the centrifugal force overcomes the biasing force of the garter spring 106 so that the contact surface 104 is effectively lifted off from contact with the extension arm 92. The life of a rubber lip seal is proportional to the lip load, which results from contact between the rotary seal and the stationary housing. Since most vehicle rotary shaft arrangements rotate at very high speeds (i.e., above 500 r.p.m.) more than 90% of operation time, a seal designed according to this invention has a far extended life because there is effectively no contact between the seal and the stationary housing for 90% of the seal life. Therefore, a seal designed according to this invention can have a seal life that is extended nine times what is expected with prior art designs.

Figure 6:
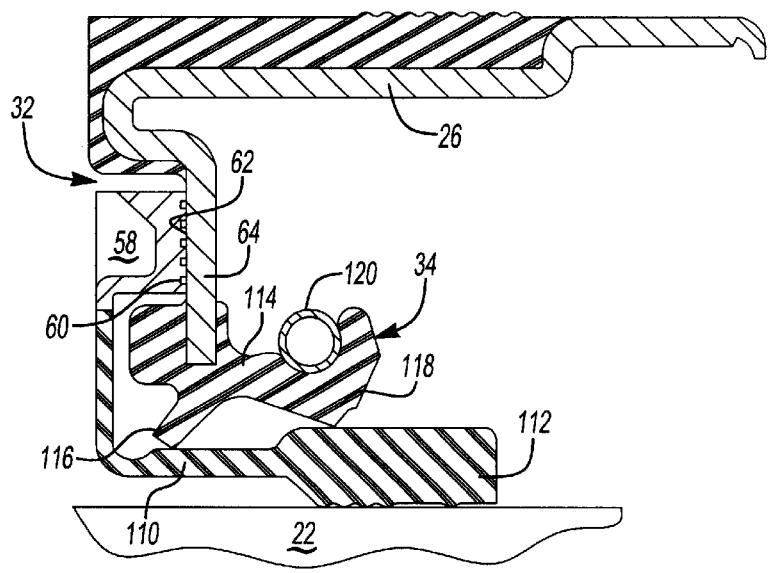
FIG. 6 is a cross-sectional illustration of still another embodiment of the inventive seal arrangement of this invention.

FIG. 6 illustrates yet another embodiment of a sealing device designed according to this invention. The first seal 32 is modified so that it is molded with a metal extension portion 110 that extends radially and then longitudinally (with respect to the shaft 22) away from the generally annular body portion of the seal 32, which includes the turbine blade portions 58. The extension portion 110 preferably is secured to a mounting portion 112 that is, in turn, supported on the outer periphery of the shaft 22. Accordingly, the first seal 32 rotates when the shaft 22 rotates.

In this embodiment, the second seal 34 does not include the same generally flexible connecting portion 70 between two ends. Rather, the seal mounting portion 64 of the housing 26 extends further away from the housing toward the shaft 22. The second seal 34 includes a first contact surface 116 and a second contact surface 118. A garter spring 120 biases the second contact surface 118 into contact with the extension portion 110.

The foregoing description is exemplary rather than limiting in nature. The preferred embodiments that have been described illustrate the features of this invention that provide for a better seal at the interface between a rotary shaft and a stationary housing while concomitantly enhancing the durability of the seal and extending expected seal life. Variations and modifications to the disclosed embodiments may become apparent to those skilled in the art that do not necessarily depart from the spirit and purview of this invention. Therefore, the legal scope of protection afforded this invention can only be determined by studying the following claims.

What is claimed is:

1. An assembly, comprising:
   a shaft having a longitudinal axis and being supported to rotate about said axis;
   a stationary member that surrounds at least a portion of said shaft such that a partially spaced interface exists between said shaft and said stationary member and said shaft rotates relative to said stationary member;
   a first seal supported proximate to said interface for rotation with said shaft including a plurality of turbine blade portions that create a fluid disturbance proximate to said interface as said shaft and said first seal rotate; and
   a second seal supported for remaining stationary with said stationary member so that said shaft rotates relative to said second seal, said second seal including a first end that is supported on a portion of said stationary member and a second end that includes a contact surface that contacts a peripheral surface on said shaft and a biasing member for biasing said contact surface toward said peripheral surface on said shaft, said second seal further including a generally flexible connecting portion extending in a radial direction relative to said shaft longitudinal axis between said first and said second ends on said second seal, and wherein said generally flexible connecting portion is bellows-like and flexes responsive to radial or axial movement of said shaft relative to said stationary member such that said contact surface remains in a desired contact with said peripheral surface on said shaft.

2. The assembly of claim 1, wherein said first seal is generally annular and includes an inner and an outer periphery, a front face extending radially between said inner and outer periphery and a rear face extending radially between said inner and outer periphery and wherein said turbine blade portions are circumferentially spaced about said front face.

3. The assembly of claim 2, wherein said turbine blade portions each have a length, a height and a width and wherein said length is greater that said height and said width, said length extending in a generally radial direction relative to said shaft and said height extending in a generally axial direction relative to said shaft, and wherein said height is defined by a distance between an end face on said turbine blade portions and said first seal front face.

4. The assembly of claim 3, wherein said turbine blade portions extend away from said front face at a predetermined angle.

5. The assembly of claim 4, wherein said angle is approximately 90 degrees.

6. The assembly of claim 3, wherein said first seal rear face includes a plurality of annular grooves near said outer periphery.

7. The assembly of claim 1, wherein said second seal further comprises a second contact surface at said second end and a biasing member that biases said second contact surface toward said peripheral surface on said shaft.

8. The assembly of claim 7, wherein said second contact surface is spaced from said first contact surface in an axial direction relative to said shaft such that a pocket portion extends generally between said first and second contact surfaces.

9. The assembly of claim 8, wherein said pocket portion includes a porous material within said pocket portion, said porous material being adapted to absorb and contain fluid within said pocket portion.

10. The assembly of claim 8, wherein said second end of said second seal includes a plurality of openings to allow fluid communication into and out of said pocket portion.

11. The assembly of claim 10, wherein said second seal is generally annular and made from a rubber material.

12. A sealing device for sealing an interface between a shaft that is adapted to rotate and a stationary member that surrounds at least a portion of the shaft, comprising:
   a mounting portion adapted to be supported by the stationary member for remaining stationary with the stationary member;
   a sealing body portion that includes a contact surface that contacts a peripheral surface on the shaft so that the shaft can rotate relative to said sealing body portion;
   a biasing member for biasing said contact surface toward the peripheral surface on the shaft; and
   a generally flexible bellows-like connecting portion extending in a radial direction relative to the shaft between said mounting portion and said sealing body portion, said generally flexible connecting portion flexing responsive to radial and axial movement of the shaft relative to the stationary member such that said contact surface remains in a desired contact with the peripheral surface on the shaft.

13. The device of claim 12, further comprising a second contact surface on said sealing body portion and a biasing member that biases said second contact surface toward said peripheral surface on the shaft, wherein said second contact surface is spaced from said contact surface in an axial direction relative to said shaft such that a pocket portion extends generally between said contact surface and second contact surfaces.

14. The device of claim 12, wherein said pocket portion includes a porous material within said pocket portion, said porous material being adapted to absorb and contain fluid within said pocket portion.

15. The device of claim 13, wherein said sealing body portion includes a plurality of circumferentially spaced openings to allow fluid communication into and out of said pocket portion.

16. An assembly, comprising:
- a shaft having a longitudinal axis and being supported to rotate about said axis;
- a stationary member that surrounds at least a portion of said shaft such that a partially spaced interface exists between said shaft and said stationary member and said shaft rotates relative to said stationary members;
- a first seal support approximate to said interface for rotation with said shaft including a plurality of turbine blade portions that create a fluid disturbance proximate to said interface as said shaft and said first seal rotate; and
- a second seal supported for remaining stationary with said stationary member so that said shaft rotates relative to said second seal, said second seal including a first end that is supported on a portion of -said stationary member and a second end that includes a first contact surface that contacts a peripheral surface on said shaft and a biasing member for biasing said first contact surface toward said peripheral surface on said shaft,
- said second seal including a second contact surface at said second end and a biasing member that biases said second contact surface toward said peripheral surface on said shaft,
- said second contact surface being spaced from said first contact surface in an axial direction relative to said shaft such that a pocket portion exists between said first and second contact surfaces, said pocket portion including a porous material within said pocket portion, said porous material being adapted to absorb and contain fluid within said pocket portion,
- said second seal further including a generally flexible connecting portion extending between said first and second ends on said second seal, and wherein said generally flexible connecting portion flexes responsive to radial or axial movement of said shaft relative to said stationary member such that said contact surface remains in a desired contact with said peripheral surface on said shaft.

17. An assembly, comprising:
- a shaft having a longitudinal axis and being supported to rotate about said axis;
- a stationary member that surrounds at least a portion of said shaft such that a partially spaced interface exists between said shaft and said stationary member and said shaft rotates relative to said stationary members;
- a first seal support approximate to said interface for rotation with said shaft including a plurality of turbine blade portions that create a fluid disturbance proximate to said interface as said shaft and said first seal rotate; and
- a second seal supported for remaining stationary with said stationary member so that said shaft rotates relative to said second seal, said second seal including a first end that is supported on a portion of said stationary member and a second end that includes a first contact surface that contacts a peripheral surface on said shaft and a biasing member for biasing said contact first surface toward said peripheral surface on said shaft,
    - said second seal including a second contact surface at said second end and a biasing member that biases said second contact surface toward said peripheral surface on said shaft,
    - said second contact surface being spaced from said first contact surface in an axial direction relative to said shaft such that a pocket portion exists between said first and second contact surfaces, said second end of said second seal including a plurality of openings to allow fluid communication into and out of said pocket portion,
    - said second seal further including a generally flexible connecting portion extending between said first and second ends on said second seal, and wherein said generally flexible connecting portion flexes responsive to radial or axial movement of said shaft relative to said stationary member such that said contact surface remains in a desired contact with said peripheral surface on said shaft.

18. A sealing device for sealing an interface between a shaft that is adapted to rotate and a stationary member that surrounds at least a portion of the shaft, comprising:
- a mounting portion adapted to be supported by the stationary member for remaining stationary with the stationary member;
- a sealing body portion that includes a first contact surface that contacts a peripheral surface on the shaft so that the shaft can rotate relative to said sealing body portion;
- a biasing member for biasing said contact surface toward the peripheral surface on the shaft;
- a second contact surface on said sealing body portion;
- a biasing member that biases said second contact surface toward said peripheral surface on the shaft, wherein said contact surface is spaced from said first contact surface in an axial direction relative to the shaft such that a pocket portion exists between said first and second contact surfaces and at least one opening in said sealing body portion permits fluid communication into and out of said pocket portion; and
- a generally flexible connecting portion extending between said mounting portion and said sealing body portion, said generally flexible connecting portion flexing responsive to radial and axial movement of the shaft relative to the stationary member such that said contact surface remains in a desired contact with the peripheral surface on the shaft wherein said pocket portion includes a porous material within said pocket portion, said porous material being adapted to absorb and contain fluid within said pocket portion.

19. The device of claim 18, wherein said sealing body portion includes a plurality of circumferentially spaced openings to allow fluid communication into and out of said pocket portion.

20. A sealing device for sealing an interface between a shaft that is adapted to rotate and a stationary member that surrounds at least a portion of the shaft, comprising:
- a mounting portion adapted to be supported by the stationary member for remaining stationary with the stationary member;
- a sealing body portion that includes a first contact surface that contacts a peripheral surface on the shaft so that the shaft can rotate relative to said sealing body portion and a second contact surface that is spaced from said first contact surface in an axial direction relative to the shaft such that a pocket portion exists between said first and second contact surfaces, the pocket portion including at least one opening to allow fluid communication into and out of said pocket portion;
- a first biasing member for biasing said first contact surface toward the peripheral surface on the shaft; and
- a second biasing member for biasing the second contact surface toward the peripheral surface on the shafts;
- a porous material within said pocket portion, said porous material being adapted to absorb and contain fluid within said pocket portion.

* * * * *

UNITED STATES PATENT AND TRADEMARK OFFICE
CERTIFICATE OF CORRECTION

PATENT NO.    : 6,513,812 B1                                    Page 1 of 1
DATED         : February 4, 2003
INVENTOR(S)   : Yang et al.

It is certified that error appears in the above-identified patent and that said Letters Patent is hereby corrected as shown below:

Column 6,
Line 60, "12" should be -- 13 --.

Signed and Sealed this

Twenty-fourth Day of June, 2003

JAMES E. ROGAN
*Director of the United States Patent and Trademark Office*